CRYOELECTRIC MEMORY EMPLOYING A CONDUCTIVE SENSE PLANE

Filed Dec. 7, 1962 3 Sheets-Sheet 1

INVENTOR.
FRANK S. WENDT
BY
[signature]
ATTORNEY

March 2, 1965 F. S. WENDT 3,172,086

CRYOELECTRIC MEMORY EMPLOYING A CONDUCTIVE SENSE PLANE

Filed Dec. 7, 1962 3 Sheets-Sheet 2

INVENTOR
FRANK S. WENDT
BY
ATTORNEY

March 2, 1965 F. S. WENDT 3,172,086
CRYOELECTRIC MEMORY EMPLOYING A CONDUCTIVE SENSE PLANE
Filed Dec. 7, 1962 3 Sheets-Sheet 3

INVENTOR.
FRANK S. WENDT
BY Samuel Cohen
ATTORNEY

United States Patent Office 3,172,086

Patented Mar. 2, 1965

3,172,086

CRYOELECTRIC MEMORY EMPLOYING A CONDUCTIVE SENSE PLANE

Frank S. Wendt, Princeton, N.J., assignor to Radio Corporation of America, a corporation of Delaware Filed Dec. 7, 1962, Ser. No. 243,032

12 Claims. (Cl. 340—173.1)

The present invention relates to memories. More particularly, the invention relates to an improved arrangement for sensing the output of a memory such as a superconductor memory.

A superconductor memory; such as described in the Digest of Technical Papers, 1961 International Solid States Conference, pages 110–111; includes a thin film superconductor plane for storing persistent circulating currents. The drive lines for the memory are located on one side of the plane. They consist of a group of X drive wires which extend in one direction and a group of Y drive wires which extend in another direction. The areas of the memory plane located beneath the intersections of the X and Y drive wires are memory locations. In general, the memory is operated so that each such area stores one binary bit.

The sense line of the memory is placed on the side of the memory plane opposite to that of the drive lines. It consists of a winding which is laid down in a zig-zag pattern that is carefully aligned with the intersections of the X and Y drive lines. A disadvantage of this sensing technique is the severe registration problem it creates. The alignment between the sense line and the XY drive line cross-over points must be precise and, in view of the close spacing of the cross-over points, the problem of obtaining such alignment may be formidable. In the memory shown in the article above, the spacing between XY cross-over is about 50 mils in each direction. Even here, the registration problem is severe. In an enlarged memory, there are 128 X drive lines and 128 Y drive lines, providing a total of 16,384 storage locations. The total area on which these cross-overs are located is 1.28 inches—a spacing of less than 10 mils between cross-overs. In a memory of this size, the problem of precisely registering a zig-zag sense winding with each XY line intersection appears to be insurmountable, at the present state of the art.

Another disadvantage of the memory above is that the sense line is relatively long. This means that the time required for a "sense signal" to propagate down the line is relatively long and is a limitation on the ultimate operating speed of the memory.

One object of the present invention is to provide a simplified arrangement for sensing the output of a memory such as a superconductor memory.

Another object of the invention is to provide a sensing arrangement which does not require precise registration between a sense winding and storage locations in the memory.

Another object of the present invention is to provide a sensing arrangement which provides a relatively high output voltage and which has a relatively good signal-to-noise ratio, that is, a relatively good "1:0" ratio. 1:0 ratio as used here relates to the relative voltage outputs obtained from the memory when reading binary "one" and binary "zero" from the memory, respectively.

Another object of the present invention is to provide a sensing means for a memory which provides good shielding against the stray pickup of signals.

Another object of the invention is to provide a sensing arrangement for a superconductor memory which can easily be fabricated as, for example, by vacuum evaporation.

Another object of the invention is to provide a sensing arrangement which is capable of operating at relatively high speed.

The arrangement of the present invention includes a conductive plane, hereafter termed a sense plane, arranged parallel to the memory plane and located on the side thereof opposite from the drive lines. The sense plane is not joined to the memory plane at any of its edges. When a memory location in the memory plane is switched from a superconducting to a normal state, an eddy current is induced in the sense plane. Suitably located terminals connected to the sense plane may be used to receive this sense current. Alternatively, a winding may be magnetically coupled to the sense plane in such manner that a current is induced therein by the eddy current.

The invention is described in greater detail below and is illustrated in the following drawings of which:

Figure 3:
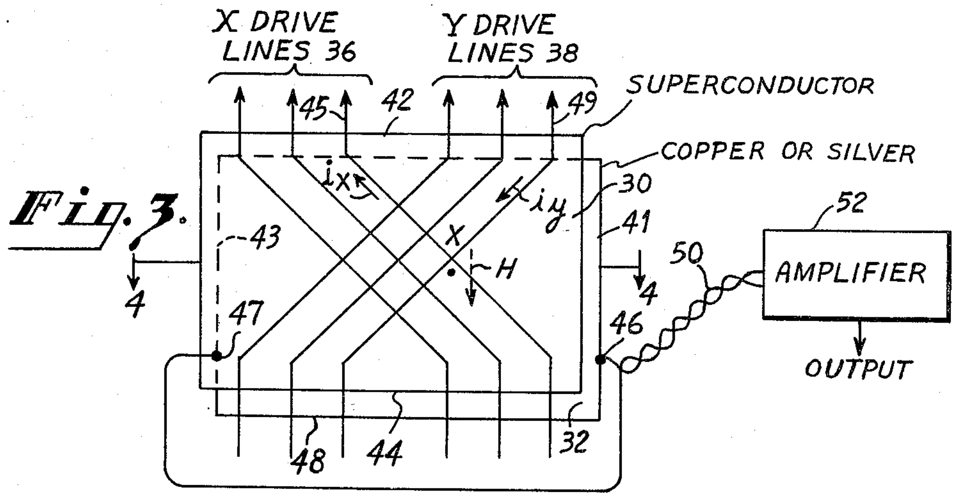
FIG. 3 is a diagrammatic showing of a memory according to the present invention.
Figure 4:
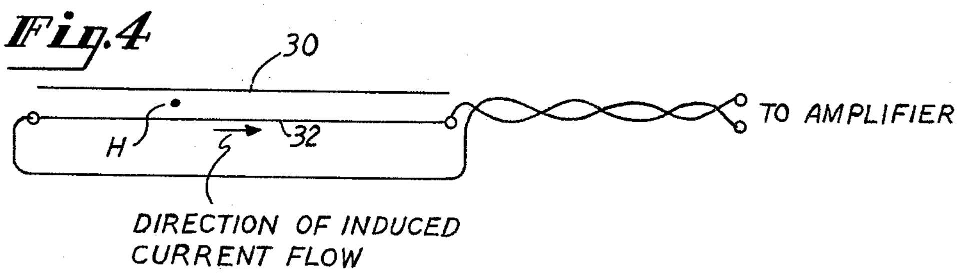
Figure 5:
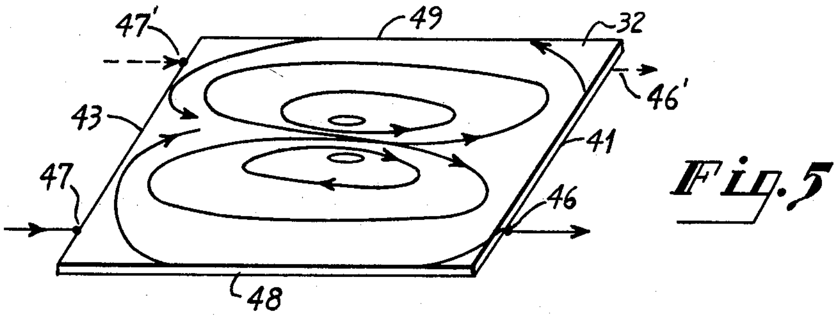
Figure 6:
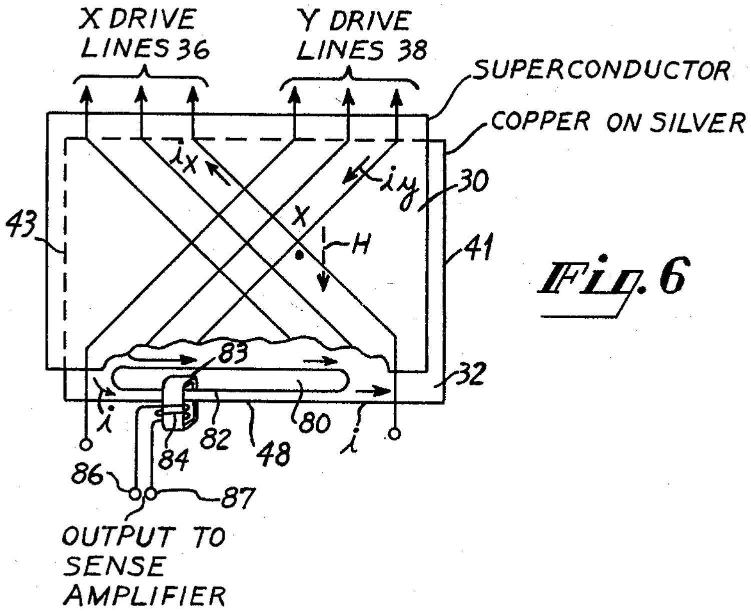
Figure 8:
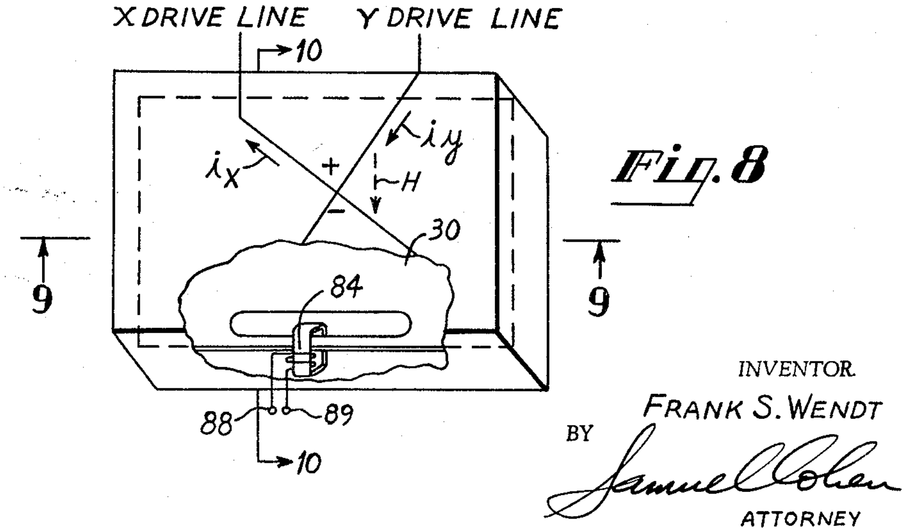
Figure 7:
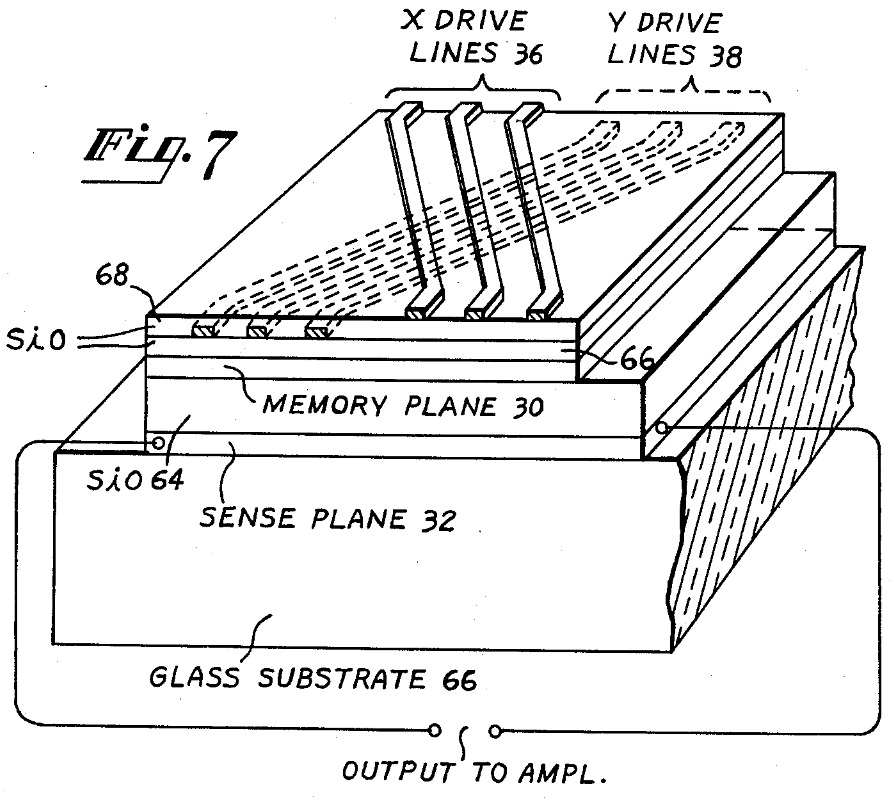
Figure 9:
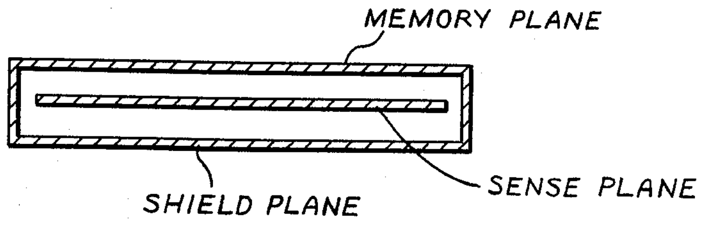
Figure 10:
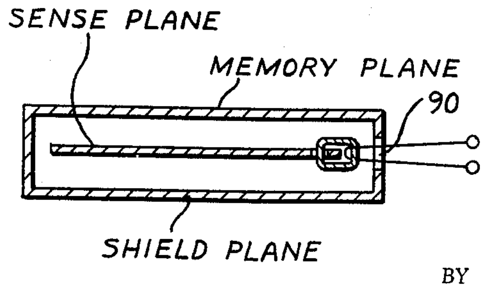

FIG. 4 s a section along line 4—4 of FIG. 3;

FIG. 5 is a sketch of the sense plane showing the lines of flow of eddy current;

FIG. 6 is a partially cut away diagram showing of a second embodiment of the present invention;

FIG. 7 is a perspective partially cut away view of a portion of the memory according to the present invention;

FIG. 8 is a partially cut away view of another embodiment of the present invention; and FIGS. 9 and 10 are sections of FIG. 8 taken along lines 9—9 and 10—10, respectively.

In the discussion which follows, similar reference numerals are applied to similar elements. Also, though not shown, it is to be understood that the memory discussed is maintained at a low temperature, such as several degrees Kelvin, at which superconductivity is possible.

Figures 1, 2:
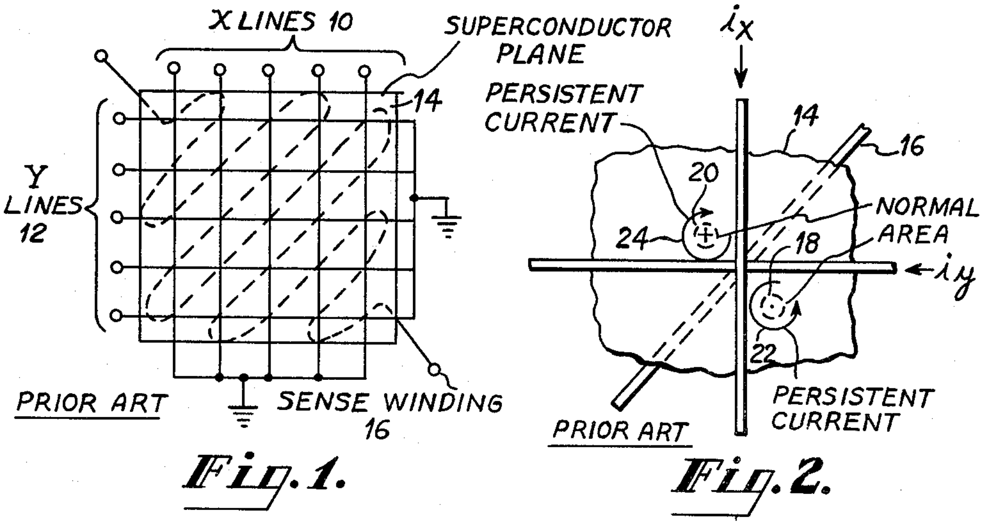
FIG. 1 is a diagrammatic showing of a prior art superconductor memory.
FIG. 2 is a sketch to help explain the operation of the circuit of FIG. 1.

The known memory shown in FIG. 1 includes X drive lines 10 and Y drive lines 12. A superconducting plane 14 located beneath the X and Y lines serves as the storage medium. A zig-zag sense winding 16 is located beneath the superconducting plane 14. As can be seen in the figure, the sense winding is in registration with the X and Y cross-overs.

In practice, there are many more X and Y lines than are shown. Further, there is electrical insulation between the various lines and planes. The memory plane may be made of tin and there may be a tin ground plane beneath the memory plane. A more complete description of the memory may be found in the article cited above.

In the operation of a memory such as shown in FIG. 1, coincident currents applied to a selected X and a selected Y line, respectively, are of sufficient amplitude, to produce a magnetic field at the intersection of the two lines which exceeds the critical field of the superconductor memory plane in the areas indicated by a dot and cross in FIG. 2. (The dot represents a magnetic field coming out of the plane of the paper and the cross represents a magnetic field going into the plane of the paper.) These areas, namely 18 and 20, switch from a superconducting to a normal state. The magnetic field produced by the currents $i_x$ and $i_y$ now penetrates this superconductor memory plane (in its superconducting state the superconducting plane 14—actually a superconducting film, acts as a magnetic shield to all magnetic fields having a field strength less than the critical field of the superconductor), and induces persistent circulating currents in the plane. These currents surround the normal areas 18 and 20.

When the X and Y drive currents are reduced to "zero," the magnetic fields surrounding the X and Y lines collapse; however, persistent currents remain in the superconductor and circulate in the directions shown at 22 and 24. Persistent currents in these directions can be arbitrarily assumed to represent storage of a binary digit of one value such as "one." Circulating persistent currents in the opposite directions then represent storage of the binary digit "zero."

To read out the bit stored at a particular location in the memory, current is applied in a standard direction to the X and Y lines which intersect that location. For example, this current may be applied in a direction to induce a circulating current into the superconductor memory plane in a direction representing storage of the binary digit "zero." In this case, if the memory location interrogated is storing a "one," the interrogation current will cause that area to go normal and a magnetic field will penetrate through the superconductor plane. This magnetic field induces a current in the sense winding 16. If the memory location interrogated is storing a "zero," the magnetic field induced by the interrogating currents tends to induce a circulating current in a direction to subtract from the persistent circulating current. In this case, the storage location does not go normal, the magnetic field does not penetrate the film, and no current is induced in the sense winding.

As already indicated, the sensing scheme just described is suitable for memories of relatively small size, that is, for a memory in which the storage locations are relatively widely spaced. In such cases, the X and Y lines are relatively large, the sense line can be made relatively large, and registration between the three lines, although in no sense a simple problem, can be accomplished with the high precision masking techniques presently available. However, as the memory capacity increases and the spacing between cross-over points and drive line widths correspondingly decrease, the registration problem becomes formidable.

The solution to this registration problem provided by the invention is shown schematically in FIG. 3. The memory plane, corresponding to superconductor plane 14 of FIG. 1, appears at 30. A second plane, the sense plane 32, is located beneath the memory plane and arranged parallel to the memory plane. Preferably, the sense plane is made of a material which is not a superconductor as, for example, copper or silver. However, the sense plane may be a superconductor which is made of the same material as the memory plane or which is made of a "softer" superconductor. In other words, if the sense plane is a superconductor, it should be formed of a material which can be driven normal as easily as or more easily (at a lower magnitude of current or magnetic field) than the superconductor of which the memory plane is made. The sense plane is not joined electrically to the memory plane.

The operation of the memory shown in FIG. 3, insofar as writing and storage is concerned, is similar to that of the one already described. Each location in the plane beneath an intersection of an X and Y drive line is capable of storing a binary digit. The digit is stored as a circulating current just as is shown in FIG. 2.

To read out the memory, concident interrogation currents are applied in a standard direction, for example, as indicated by the arrows $i_x$ and $i_y$ on the X and Y drive lines of FIG. 3. If the binary bit stored at a location interrogated is such that the interrogation currents switch this location normal, a magnetic field H penetrates the superconductor plane as is shown in FIGS. 3 and 4. The magnetic field H between the two planes is in a direction parallel to the planes (see FIG. 3). This magnetic field component is believed to induce a current in the sense plane. The direction of this induced current flow is illustrated in FIGS. 4 and 5. Output terminals positioned at edges 41 and 43 of the sense plane and an external circuit coupled between these terminals provide a return path for a small portion of this current. Two such terminals are shown at 46 and 47, respectively. These are connected through a twisted pair 50 to an amplifier 52.

In the circuit of FIG. 3, only one pair of output terminals is shown. With one pair of such terminals, the amount of current sensed will depend in part upon the location in the memory plane through which the magnetic field H due to coincident drive currents penetrates. Therefore, to make the sense signal output more uniform it is preferred to have a number of output terminals along each edge 41 and 43 of the sense plane. For example, the edge 41 may have two output terminals such as indicated at 46, 46' in FIG. 5 and correspondingly, the edge 43 may have two output terminals 47, 47'. Preferably, such terminals are equally spaced from opposite edges 47, 49 of the sense plane. The two terminals 46, 46' are connected to a common terminal on the amplifier and the output terminals 47 and 47' are connected to a second common terminal. While not shown, it should be appreciated that more than two output terminals can be connected to each edge 41 and 43 of the sense plane.

In a practical memory according to FIG. 3, the plane 30 may be formed of a superconductor material such as tin. As already mentioned, the sense plane 32 is preferably formed of a conductor such as copper or silver. The spacing between planes 30 and 32 may be achieved by an insulator such as a silicon monoxide film. This film may be from 3000 Angstroms or less to 10,000 Angstroms or more thick. The precise thickness, that is, the spacing between the two planes is not critical. The X and Y drive lines are preferably printed lines and are insulated both from one another and from the memory plane. As in the case above, the insulation may be a film of silicon monoxide, or the like, several thousand Angstroms thick.

It is preferred that the X and Y drive lines pass the edges 44 and 42 of the memory plane 30 at right angles. When so oriented, the magnetic fields at the edges of the planes, which result from the currents pasisng through the drive lines, are oriented in a direction to induce minimum extraneous eddy currents in the sense plane. In other words, the eddy currents which are produced by "half select" currents will circulate in the direction such that their tendency to induce sense signals at the output terminals is minimized.

Preferably, the X and Y drive lines are oriented as shown in FIG. 3. This orientation provides a useful magnetic field component H of greatest magnitude for a given drive current. If the magnetic field induced by the current is at an angle to the direction shown, the component useful in producing a sense signal is reduced as is the sense signal.

A second embodiment of the invention is shown in FIG. 6. It is in many respects similar to the embodiment of FIG. 3. However, the output terminals of the sense plane are not connected to the edges 41 and 43 of the sense plane. Instead, a slot 80 is formed in the sense plane close to and substantially parallel to the edge 48 of the sense plane. The narrow portion 82 of the sense plane between the slot and the edge 48 then acts like a current carryng wire and can serve essentially as the primary winding of a transformer. The core 83 of the transformer surrounds a portion of the winding 82. The current passing through the primary winding 82 is sensed by a coil 84 wound on the core 83. The coil 84, which acts as the secondary winding of the transformer, leads to the output terminals 86, 87.

A third embodiment of the invention is illustrated in FIGS. 8–10. This embodiment of the invention is similar to the embodiment of FIG. 6. However, in addition to the memory and sense planes, a third plane is located on the side of the sense plane opposite from the memory plane. This third plane, hereafter termed a "shield plane," is folded up at its edges and joined to the memory plane. The output leads 88 and 89 pass through an opening 90 (shown in FIG. 10) in one of the folded up portions of the shield plane.

The operation of the memory of FIG. 8 is similar to that of the memory of FIG. 6. The purpose of the shield plane is to prevent edge excitation of the sense plane. In other words, it prevents any half select currents from inducing currents in the sense plane.

While not illustrated, it should be appreciated that the embodiment of the invention of FIGS. 3–5 may also include a shield plane. This embodiment is not illustrated as the construction is quite analogous to that of the embodiments of FIGS. 8–10.

FIG. 7 shows some of the structural details of a cryoelectric memory of the type illustrated schematically in FIGS. 3–5. The dimensions of the various elements are given in the following list. These dimensions are illustrative but are not to be taken as limiting.

Glass substrate 66—1 x 3 x 1/8 inch slide, or 2 x 2 x 1/8 inch slide
Sense plane 32—3,000 Angstroms silver
Silicon monoxide layer 64—3,000 to 10,000 Angstroms
Memory plane 30—3,000 Angstroms (tin)
Silicon monoxide layer 66—3,000 Angstroms thick
X and Y drive lines—3,000 Angstroms thick (The width of these lines and the spacing between them depends upon the number of storage locations it is desired to pack into the limited space available. Typical widths are 5–15 mils, however, for very large capacity memories, widths of substantially less than 5 mils may be used.)
Silicon monoxide layer 68 and the covering layer which is not shown—each 3,000 Angstroms thick.

What is claimed is:

1. In a thin film cryoelectric memory, in combination, a superconductor memory plane; drive lines on one side of the memory plane for writing information into a plurality of locations in the memory plane; a continuous sheet conductive sense plane spaced from the memory plane throughout its entire extent and arranged parallel to the memory plane, said sense plane being located on the side of the memory plane opposite from the drive lines; and output means coupled solely to the sense plane for producing an output signal in response to the penetration of a magnetic field through the memory plane.

2. In a thin film cryoelectric memory, in combination, a superconductor memory plane; intersecting drive lines on one side of the memory plane for writing information into a plurality of locations, beneath the respective drive line intersections, in the memory plane; a conductive sense plane spaced from the memory plane throughout its entire extent and arranged parallel to the memory plane, said sense plane being located on the side of the memory plane opposite from the drive lines; and output means coupled solely to the sense plane for producing an output signal in response to the penetration of a magnetic field through the memory plane.

3. In a thin film cryoelectric memory, in combination, a superconductor memory plane; intersecting drive lines on one side of the memory plane for writing information into a plurality of locations, beneath the respective drive line intersections, in the memory plane; a conductive sense plane spaced from the memory plane throughout its entire extent and arranged parallel to the memory plane, said sense plane being located on the side of the memory plane opposite from the drive lines; output means coupled solely to the sense plane for producing an output signal in response to the penetration of a magnetic field through the memory plane; and a super-conductor shield plane surrounding the sense plane and connected at its edges to the memory plane.

4. In a thin film cryoelectric memory, in combination, a superconductor memory plane; intersecting drive lines on one side of the memory plane for writing information into a plurality of locations, beneath the respective drive line intersections, in the memory plane; a conductive sense plane spaced from the memory plane throughout its entire extent and arranged parallel to the memory plane, said sense plane being located on the side of the memory plane opposite from the drive lines; and output means comprising terminal means at one edge of the sense plane and terminal means at the opposite edge of the sense plane for producing an output signal in response to the penetration of a magnetic field through the memory plane.

5. In a thin film cryoelectric memory, in combination, a superconductor memory plane; drive lines on one side of the memory plane for writing information into the memory plane; a conductive continuous sheet sense plane spaced from the memory plane throughout its entire extent and arranged parallel to the memory plane, said sense plane being located on the side of the memory plane opposite from the drive lines; and output means comprising one terminal at one edge of the sense plane and a second terminal at the opposite edge of the sense plane for producing an output signal in response to the penetration of a magnetic field through the memory plane.

6. In a thin film cryoelectric memory, in combination, a superconductor memory plane; intersecting drive lines on one side of the memory plane for writing information into a plurality of locations, beneath the respective drive line intersections, in the memory plane; a conductive sense plane spaced from the memory plane throughout its entire extent and arranged parallel to the memory plane, said sense plane being located on the side of the memory plane opposite from the drive lines; and output means comprising a first plurality of terminals at one edge of the sense plane and a second plurality of terminals at the opposite edge of the sense plane for producing an output signal in response to the penetration of a magnetic field through the memory plane.

7. In a thin film cryoelectric memory, in combination, a superconductor memory plane; intersecting drive lines on one side of the memory plane for writing information into a plurality of locations, beneath the respective drive line intersections, in the memory plane; a conductive sense plane spaced from the memory plane throughout its entire extent and arranged parallel to the memory plane, said sense plane being located on the side of the memory plane opposite from the drive lines; output means comprising one terminal at one edge of the sense plane and a second terminal at the opposite edge of the sense plane for producing an output signal in response to the penetration of a magnetic field through the memory plane; and a superconductor shield plane on the side of the sense plane opposite from the memory plane and joined at its edges to the memory plane.

8. In a thin film cryoelectric memory, in combination, a superconductor memory plane; intersecting drive lines on one side of the memory plane for writing information into a plurality of locations, beneath the respective drive line intersections, in the memory plane; a substantially continuous sheet conductive sense plane spaced from the memory plane throughout its entire extent and arranged parallel to the memory plane, said sense plane being located on the side of the memory plane opposite from the drive lines; and output means comprising said sense plane formed with a slot along one edge thereof, and a winding inductively coupled to the portion of the sense plane between the slot and the edge of the sense plane closest to the slot.

9. In a thin film cryoelectric memory, in combination, a superconductor memory plane; intersecting drive lines on one side of the memory plane for writing information into a plurality of locations, beneath the respective drive line intersections, in the memory plane; a conductive sense plane spaced from the memory plane throughout its entire extent and arranged parallel to the memory plane, said sense plane being located on the side of the memory plane opposite from the drive lines; and output means comprising means inductively coupled to the sense plane for producing an output when a magnetic field penetrates through the memory plane.

10. In a thin film cryoelectric memory, in combination, a superconductor memory plane; drive lines on one side of the memory plane for writing information into the memory plane; a conductive sense plane spaced from the memory plane throughout its entire extent and arranged parallel to the memory plane, said sense plane being located on the side of the memory plane opposite from the drive lines; output means comprising means inductively coupled to said sense plane for producing an output when a magnetic field penetrates through the memory plane; and a superconductor shield plane surrounding the sense plane and joined at its edges to the memory plane.

11. In a thin-film cryoelectric memory, in combination, a superconductor memory plane;

a plurality of $x$ drive lines which are insulated from the memory plane and which lie side by side arranged on one side of and lying in a plane parallel to the memory plane;

a plurality of $y$ drive lines which are insulated from the $x$ drive lines and extend at substantially right angles thereto, lying adjacent and parallel to the $x$ drive lines;

a continuous sheet conductive sense plane spaced from the memory plane throughout its entire extent and arranged parallel to the memory plane, said sense plane being located on the side of the memory plane opposite from the drive lines; and output means coupled solely to the sense plane for producing an output signal in response to the penetration of a magnetic field through the memory plane.

12. In a thin-film cryoelectric memory, in combination, a superconductor memory plane;

a plurality of $x$ drive lines which are insulated from the memory plane and which lie side by side arranged on one side of and lying in a plane parallel to the memory plane;

a plurality of $y$ drive lines which are insulated from the $x$ drive lines and extend at substantially right angles thereto, lying adjacent and parallel to the $x$ drive lines;

a continuous sheet conductive sense plane spaced from the memory plane throughout its entire extent and arranged parallel to the memory plane, said sense plane being located on the side of the memory plane opposite from the drive lines;

means coupled to the $x$ and $y$ drive lines for concurrently applying pulses to a selected $x$ drive line and a selected $y$ drive line of an amplitude such that the memory location at the intersection of the selected drive lines is driven normal and a magnetic field penterates through the memory plane; and output means coupled solely to the sense plane for producing an output signal in response to the penetration of a magnetic field through the memory plane.

References Cited by the Examiner

UNITED STATES PATENTS

| | | | |
|---|---|---|---|
| 2,914,735 | 11/59 | Young | 340—173.1 |
| 2,966,647 | 12/60 | Lentz | 340—173.1 |
| 2,989,714 | 6/61 | Park et al. | 340—173.1 |
| 3,048,825 | 8/62 | Schmidlin et al. | 340—173.1 |
| 3,059,196 | 10/62 | Lentz | 340—173.1 |
| 3,078,445 | 2/63 | Sass | 340—173.1 |
| 3,094,685 | 6/63 | Crowe | 340—173.1 |

OTHER REFERENCES

Publication I, Digest of Technical Papers, 1961, International Solid State Conference, pages 110–111.

Publication II, IBM Technical Disclosure Bulletin, vol. 3, No. 9, February 1961, pages 41–42.

IRVING L. SRAGOW, *Primary Examiner.*